UNITED STATES PATENT OFFICE.

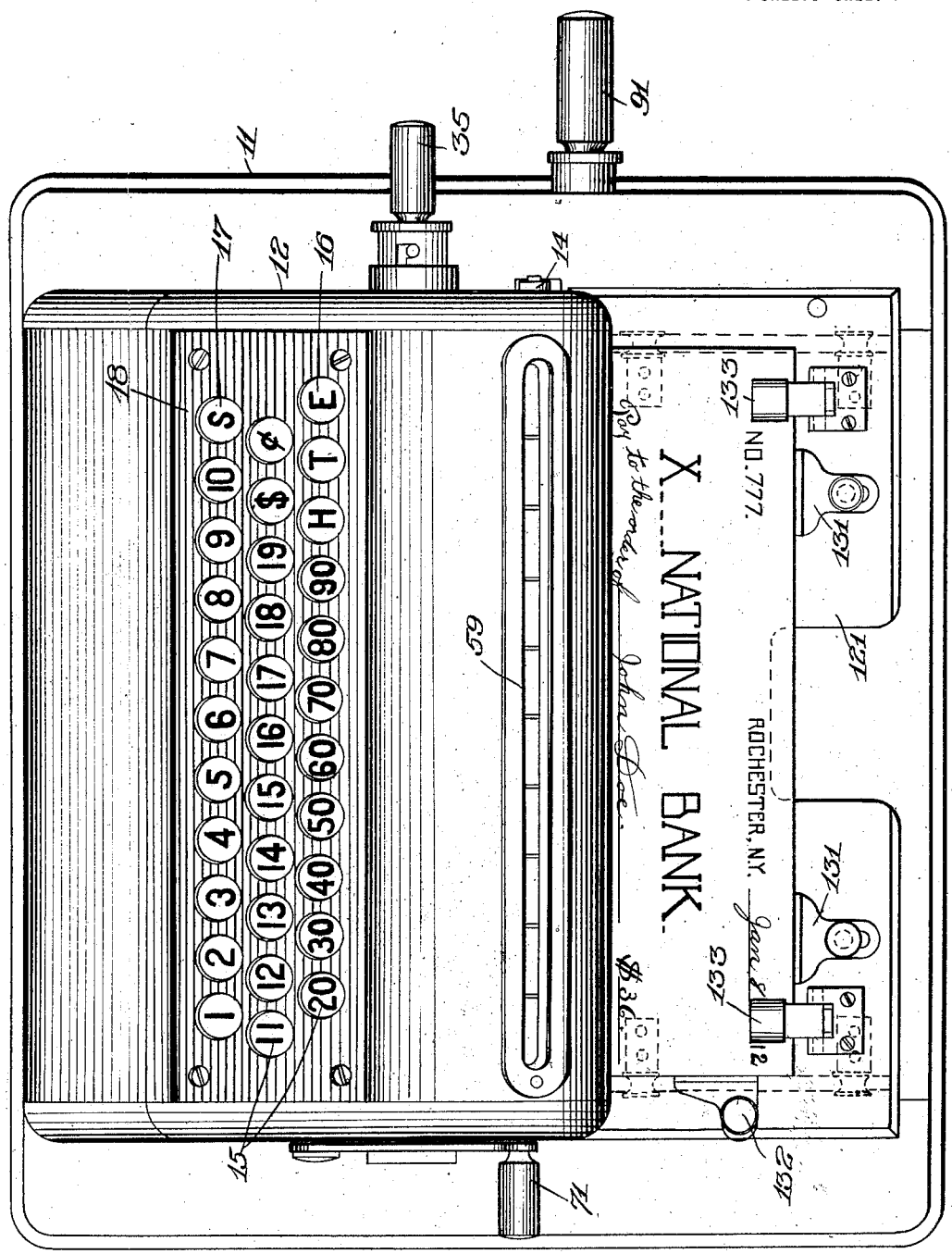

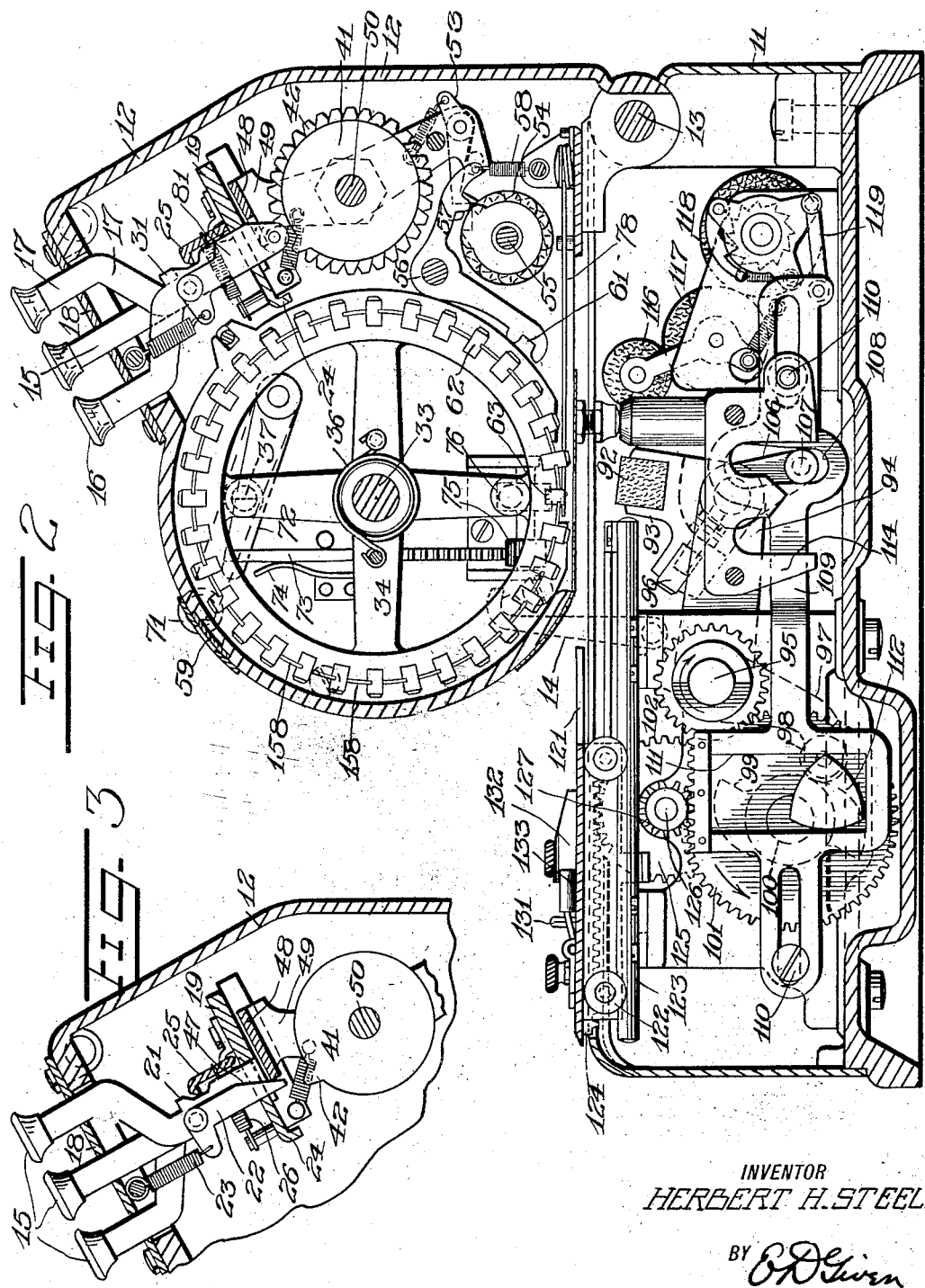

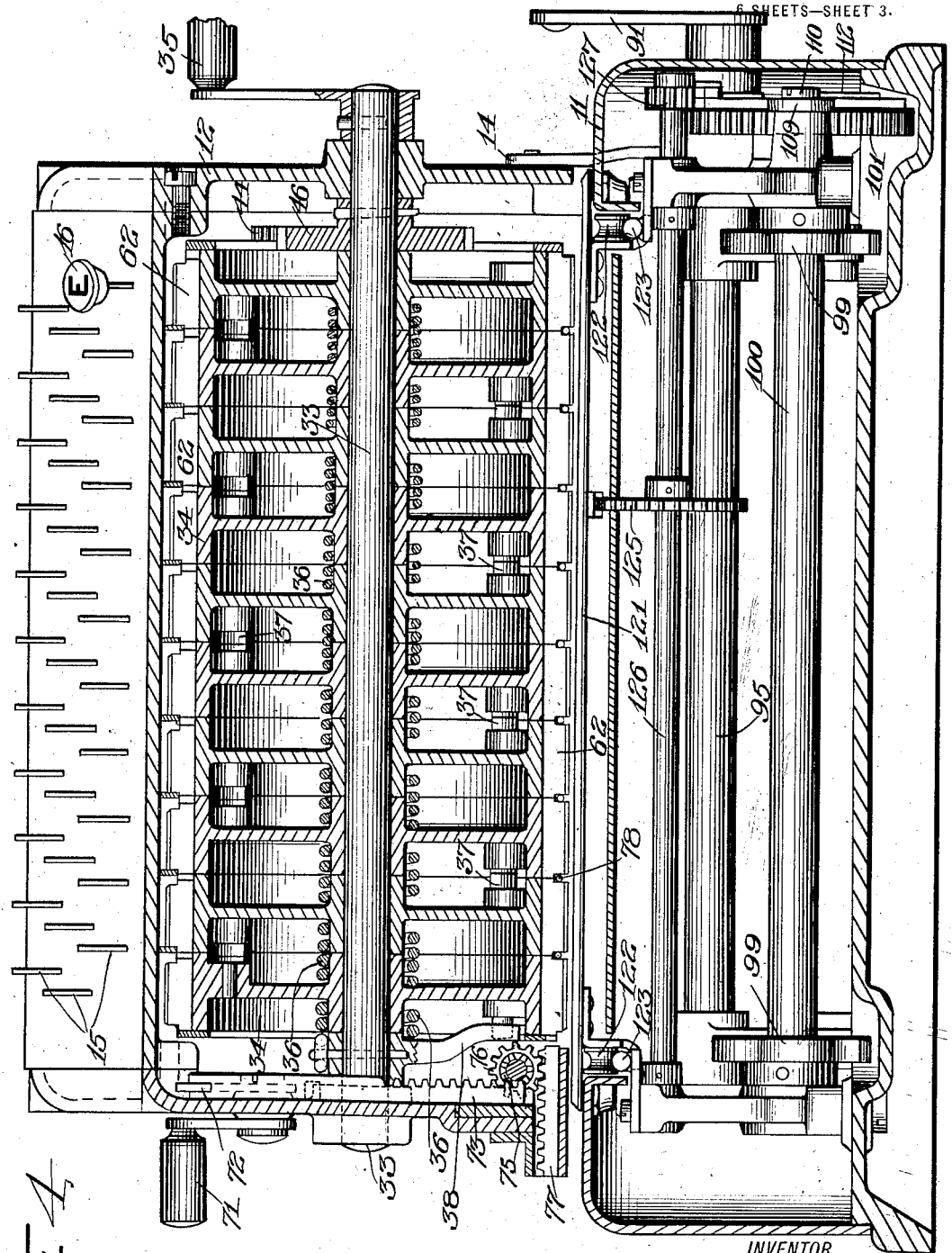

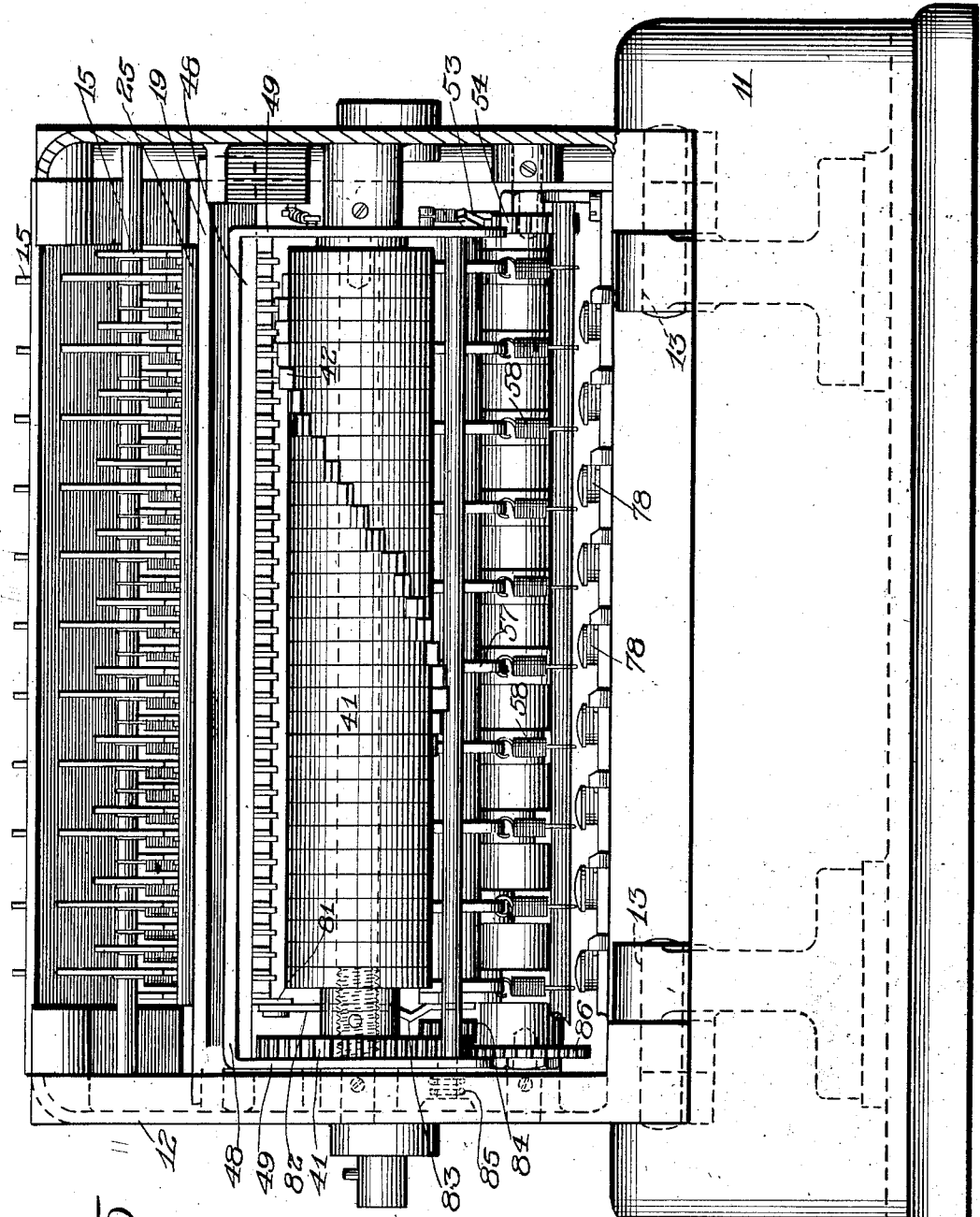

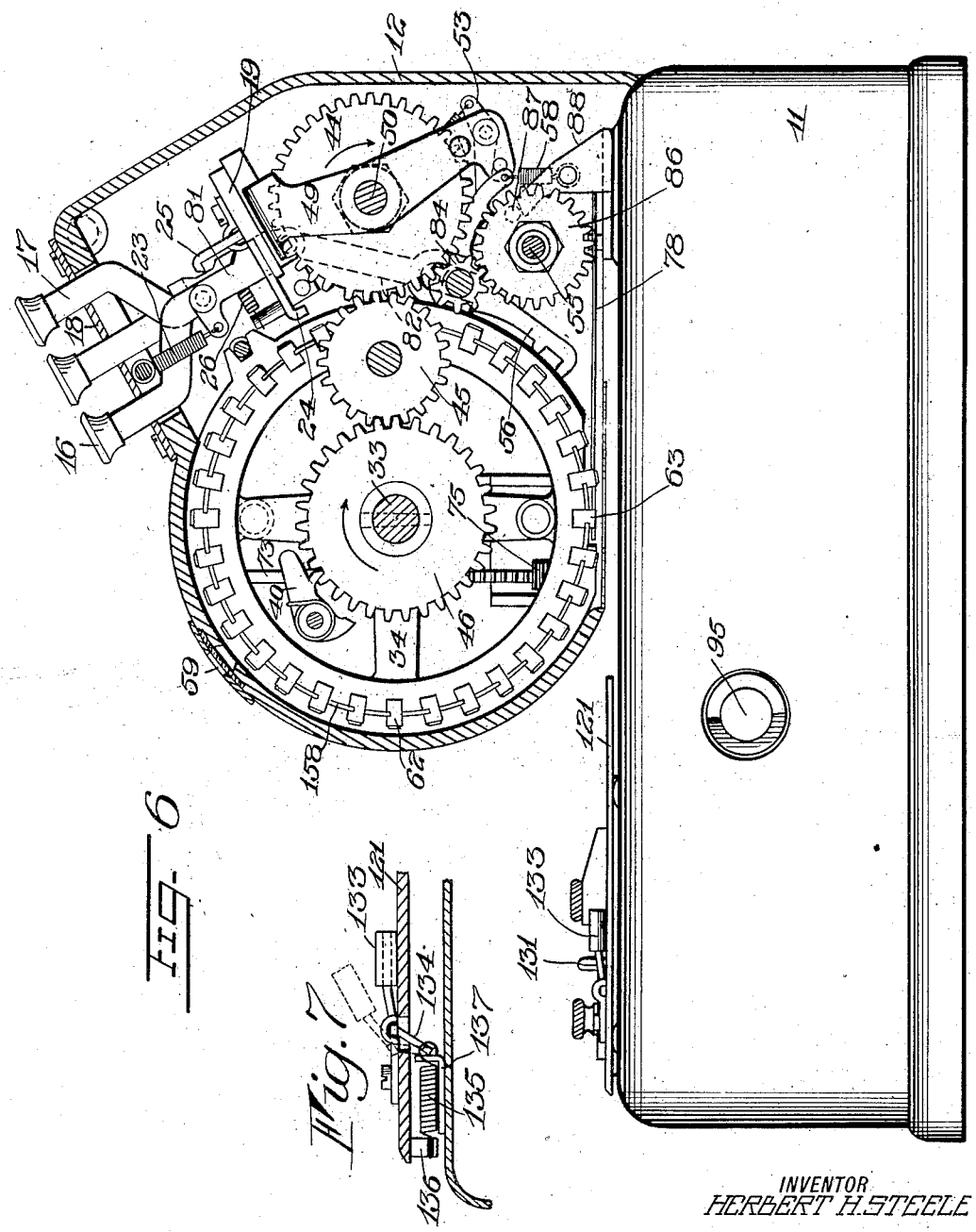

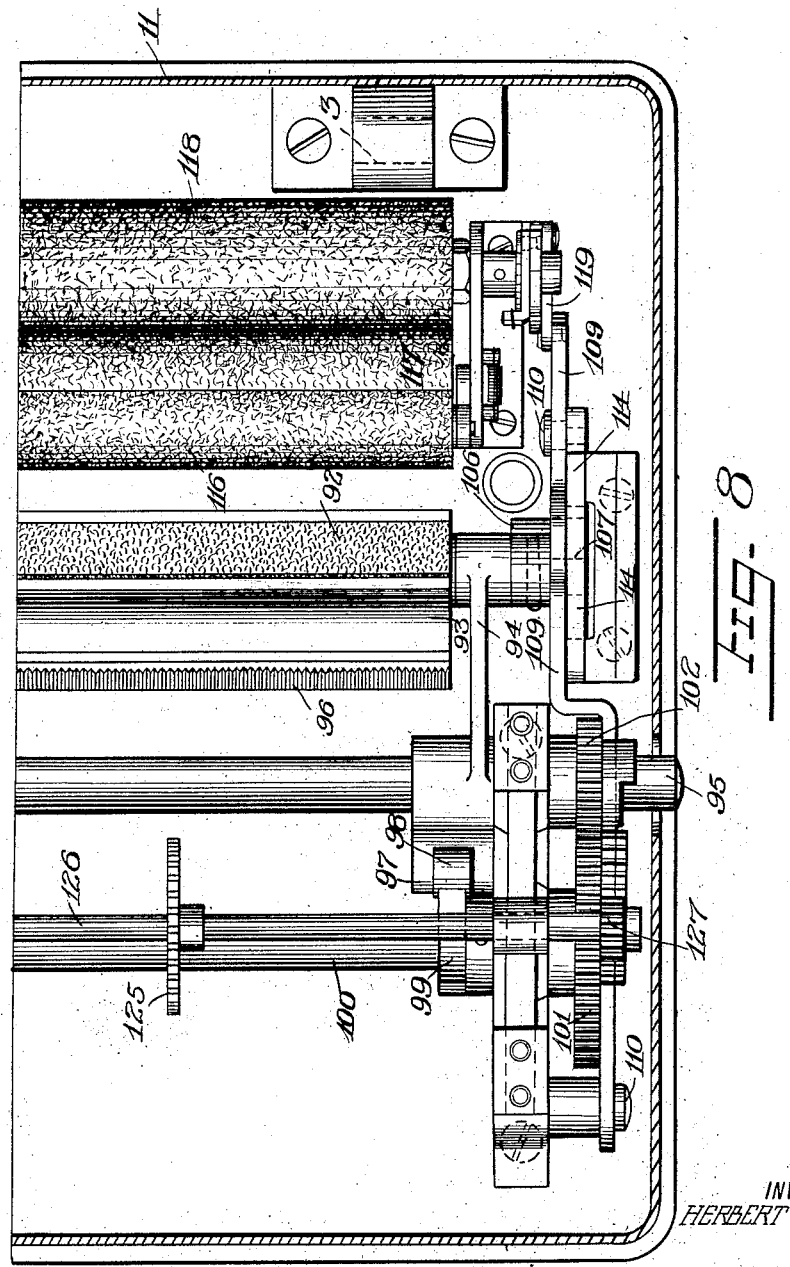

HERBERT H. STEELE, OF PITTSFORD, NEW YORK, ASSIGNOR TO TODD PROTECTO-GRAPH COMPANY, OF ROCHESTER, NEW YORK, A CORPORATION OF NEW YORK.

CHECK-WRITER.

1,400,575. Specification of Letters Patent. Patented Dec. 20, 1921.

Application filed April 21, 1919. Serial No. 291,617.

*To all whom it may concern:*

Be it known that I, HERBERT H. STEELE, a citizen of the United States of America, and a resident of Pittsford, in the county of Monroe and State of New York, have invented certain new and useful Improvements in Check-Writers; and I hereby declare the following to be a full, clear, and exact description of the same.

This invention relates generally to printing machines and has particular reference to what are known as check writers because they are used mainly to fill in the amounts on checks and like commercial instruments.

A broad object of the invention is to provide a key controlled machine of the kind mentioned which can be quickly and conveniently used to print in words the value that the check or other instrument is intended to have. However, as will be better understood later, certain features of the construction are not necessarily confined to use in key controlled machines.

With this and incidental objects in view the invention consists in the novel combination and arrangement of parts, the features of novelty of which are pointed out in appended claims and a preferred form of embodiment of which is hereinafter described with reference to the accompanying drawings.

Of said drawings:

Figure 1 is a top plan view of the complete machine with a check in position on the work receiving table.

Fig. 2 is a right hand view of the assembled mechanism.

Fig. 3 is a detail showing the construction of the word keys and parts immediately associated therewith.

Fig. 4 is substantially a transverse vertical section through the machine with some of the parts projecting beyond the plane of the section.

Fig. 5 is a rear view of the mechanism in the upper part of the machine.

Fig. 6 is a right hand view of the machine with the upper part of the casing cut away.

Fig. 7 is a detail illustrating the construction and operation of the paper gripping devices.

Fig. 8 is a top plan view of part of the inking and platen operating mechanism.

The machine in the drawings has a substantially rectangular base portion 11 containing the platen operating and inking mechanism and a casing 12, hinged to the base as shown at 13 (Fig. 2), containing the type mechanism. A latch 14 (see also Fig. 1) normally holds the two sections together.

Across the upper rear part (Fig. 1) of the machine is a key board comprising thirty-one printing keys 15, an error key 16 and a key 17 which, for the want of a better name, is called the spacing key. The keys are arranged in three rows in the key board but, as shown in Fig. 3, are formed to bring their lower ends in horizontal alinement across the machine. The keys are slidably mounted in a plate 18 fastened to the casing 12 and a bar 19 extending across the machine. Pivoted to the side of each of the word keys is a pawl 22 connected by a spring 23 to the machine casing. The springs 23 are normally under a slight tension to hold the pawls 22 in the position shown in Fig. 3 with the forward edges of the pawls in contact with the ends of slots (not shown) in a comb 24. It is clear that the springs 23 will serve to return depressed keys to their normal or undepressed positions.

On the rear edge of each key 15 is a shoulder 21 coöperating with a detent 25 extending across all of the keys. The detent is held in engagement with the keys by a spring 26. When any key is depressed, its shoulder 21 will swing the detent rearward until the shoulder has reached the point where the detent can swing back into position to engage the shoulder and hold the key depressed. It is clear, of course, that with this construction depression of one key to move the detent rearward will, at the same time, release any key previously depressed. As shown in Fig. 2, the error key 16 is substantially the same as the word keys 15 except that it has a portion 31 which will, when the error key is depressed, prevent the detent 25 from returning to its key retaining position until the error key has been released. The purpose, of course, is to provide a means whereby any previously operated key may be released. The error key also has another function which will be described in detail later on.

Extending across the machine is a shaft 33 supporting a series of type carriers 34.

At its right hand end the shaft 33 is provided with an operating handle 35 by means of which the shaft may be turned. As shown in Fig. 4, the left hand type carrier 34 is connected by a torsion spring 36 to the shaft. The left hand type carrier is in turn connected by a separate torsion spring 36 to the next carrier and this form of connection is followed all the way across to the right hand side of the machine. The springs 36 tend at all times to rotate the connected carriers in opposite directions, but studs 37 having flat engaging faces limit the relative movement of the type carriers in one direction. An arm 38 fastened to the shaft 33 coöperates with the stud on the left hand type carrier. The spring 36 at the left is stronger than the one next to it and so on across the machine, the spring at the right hand being the weakest of all. It is clear that when the handle 35 is turned the resulting movement of the shaft 33 will be transmitted to the type carriers 34 and the carriers will move as a unit.

Mechanism is provided for arresting the type carriers one at a time beginning with the right hand carrier to set up the inscription to be printed. The mechanism for arresting the type carriers comprises an element 41 which may be a solid cylinder with shoulders 42 on its surface. For ease in manufacturing, however, the present machine instead of using the solid cylinder uses disks, each carrying a single shoulder. These disks are placed in proper relation and then fastened together to make up a unit having one of the shoulders for each of the word keys 15 and one for the spacing key 17. The shoulders 42 are so positioned that they coöperate with their respective keys to operate mechanism described in detail later on to arrest the type supports in positions where the type thereon corresponding to the operated keys will be in printing position.

The unit carrying the shoulders 42 is given a complete rotation at each turn of the handle 35 by means of gears 44, 45 and 46 (Fig. 6) and during the rotation, the shoulder 42 corresponding to the operated key will engage and operate mechanism for arresting a type carrier in position to print the word corresponding to the key. A spring pressed pawl 40 (Fig. 6) coöperating with the gear 46 prevents reverse movement of the gears. The mechanism actuated by the shoulders 42 includes the pawls 22, previously mentioned, carried by the word keys 15. Each of these pawls has a cam edge 47 (Fig. 3) engaging the forward edge of a bail 48 (Fig. 2) extending across the machine and having its side arms 49 pivoted on the shaft 50 which also supports the unit composed of the disks 41. When a key is depressed, the lower end of its pawl 22 will be carried into the path of the corresponding shoulder 42 and when the shoulder strikes the pawl during the rotation imparted by the handle 35, the pawl will be swung rearward, thereby also carrying the bail 48 toward the rear of the machine.

The left hand side arm 49 of the bail carries a pawl 53 (Fig. 2) engaging the teeth of a ratchet wheel 54 (see also Fig. 5) attached to the end of a shaft 55. It is clear that each time a word key is depressed and the handle 35 turned, the pawl 53 will be swung toward the front of the machine, this movement being sufficient to turn the shaft 55 one step in a counter-clockwise direction (Fig. 2). For reasons clearer later on, the pawl 53 is normally out of engagement with the teeth of the ratchet wheel 54. The first movement of the key will cause the cam edge 47 of the pawl 22 to move the bail 48 far enough for the pawl to contact the tooth of the ratchet wheel 54 so that the subsequent further movement of the bail by the shoulder 42 will impart a full step of movement to the shaft 55.

Fastened to the shaft 55 is a series of cams of gradually increasing length from right to left across the machine. Coöperating with these cams is a series of pivoted latches 56 having shoulders 57 resting upon the peripheries of the cams. The latches 56 are always under the influence of springs 58. At each step of rotation of the shaft 55 one of the cams will be carried out of engagement with the shoulder 57 of the corresponding latch, thereby allowing the spring 58 to swing the latch. The arrangement of the cams is such that at each operation of the operating handle 35 a latch 56 will be released, the releases occurring successively one at a time beginning at the right hand side. As this occurs, jaws 61 on the latches 56 will each engage one of a set of type forms 62 carried by each type carrier or support 34.

From the foregoing it is clear that if all of the parts of the machine are in normal position depression of a key and operation of the handle 35 will cause the right hand latch 56 to be released and the right hand type carrier will be stopped in position to print the desired word. Then another key can be operated and the handle 35 given another turn whereupon the latch 56 for the second type carrier will be released and that type carrier arrested at the desired position. This operation is repeated until the entire amount has been set up ready for printing. Portions 158 of the type supports may be provided with words to show through a reading opening 59 so the operator can see that the type carriers are correctly set.

The type forms 62 are slidably mounted in the carriers or supports 34. After the carriers have been adjusted to compose the desired printing line, the forms are pushed together so that the words will be printed in close juxtaposition, that is, without leaving gaps which might be filled in. Before this is done, however, the spacing key 17 is used and the machine operated, the shoulder 42 corresponding to that key being so positioned that it will latch the left hand carriers which are not to print in positions where blank sliding slugs 63 (Fig. 2) will be at the printing position.

The mechanism for sliding the type forms together comprises a handle 71 at the left hand side of the machine. Rigid with this handle is an arm 72 (Figs. 2 and 4) engaging the upper end of a rack 73 slidably supported just inside of the left hand portion of the casing. A friction spring 74 engaging the rack 73 serves to hold the rack and handle 71 in normal position.

Meshing with the rack 73 is a pinion 75 rigid with a pinion 76 meshing with a sliding rack 77 in alinement with the printing position of the type. When the handle 71 is operated, the rack 77 will be thrust to the right (Fig. 4) thereby moving all of the type forms or bars together to close up gaps. Springs 78, one for each type carrier, serve to return the bars to normal relation with their carriers when the handle 71 and parts actuated thereby are restored to their original positions.

After the type forms have been moved together by operation of the handle 71 an impression is taken, but before describing the impression taking mechanism it will probably be best to describe the mechanism for restoring the type supports to normal relation with the operating handle and for restoring the cam shaft 55 to its starting point.

The first step in the restoring operation is to depress the error key and hold it in depressed position. This will release the spacing key 17 which was operated for the purpose hereinbefore explained and will also render effective mechanism for reversely moving the shaft 55 and the cams thereon until they reach their normal starting point. For the latter purpose, the error key 16 has pivoted to its side an element 81 (Fig. 6) which is in turn pivoted at its lower end to a link 82 (see also Fig. 5) slidably supported at its lower end by the shaft which also supports the pivoted latches 56. Near its lower end the link 82 is provided with a cam surface 83 to engage a pinion 84 and slide the pinion toward the right hand side frame and against the tension of a spring 85. The pinion 84 is at all times in engagement with the gear 44 and when it is slid by the cam surface 83 as just described, it becomes meshed with a gear 86 fastened to the cam shaft 55. After the pinion 84 has been engaged with the gear 86 it is held in engagement by the depressed error key while the handle 35 is turned until it is stopped. This will, through the gears 46, 45, 44, pinion 84 and gear 86, drive the shaft 55 in a clockwise direction, that is, in the direction opposite to that in which it was turned by operation of the actuating pawl 53 when the machine was operated to set the type carriers. This opposite or restoring movement of the shaft 55 is limited by a stud 87 attached to the side of the gear 86 striking the upper end of a stationary stop 88. After the shaft 55 is restored the error key is released, allowing the spring 85 to move the pinion 84 out of engagement with the gear 86 leaving the shaft 55 in correct position for the beginning of another series of type carrier setting operations.

It is, of course, clear that as the shaft 55 is rotated back to its starting position as just described, the cams on the shaft will be successively carried back from under the shoulders 57 on the latches 56, thereby returning the latches to the position shown in Fig. 2 and disengaging the jaws 61 from the forms or slugs 62. As the jaws are disengaged, the springs 36 will rotate the adjacent type carriers in opposite directions until their movements are arrested by the overlapping or engaging studs 37. When these studs are in engagement the type carriers will be in normal relation with the shaft 33 and operating handle 35. The printing keys 15 and the operating handle 35 may now be operated to set up a new printing line.

The mechanism for taking impressions from the type is operated by an operating handle 91. The mechanism is so constructed that two turns of the handle 91 are required to effect printing, the first turn inking the type and the second operating a platen to take the impression.

The ink is applied by means of a pad 92 (Figs. 2 and 8) of felt or other suitable material mounted in a slot extending longitudinally of a frame 93 long enough to extend across all of the type carriers and pivotally supported at its ends by arms 94 loose on a shaft 95. Mounted in a second slot in the frame 93 is a platen or impression bar 96. The platen bar and the type faces both may be so constructed as to shred the paper in the manner fully shown and described in Letters Patent #793,249 issued June 27, 1905, to L. M. Todd. Rigid with the arms 94 are arms 97 in which are rotatably mounted rollers 98 engaging the peripheries of cam members 99 fastened to a shaft 100. Secured to the shaft 100 is a large gear 101 meshing with a small gear 102 rigid with the handle 91. The ratio of the gears 101 and 102 is such that each rotation of the handle 91 will cause a half rotation of the gear 101 and during each of such half rotations, one of the two cams on each cam member 99 will act against the roller 98 to swing the frame 93 up toward the type. The first of these movements will press the ink pad 92 against the positioned type to apply ink. Before the second cam of the cam member again raises the frame 93, the frame will be rocked to bring the platen 96 in alinement under the type.

The ink pad is carried away from the printing line and the platen toward the printing line by rocking the frame 93. This rocking movement is effected by devices comprising an arm 106 rigid with the frame and carrying a stud 107 engaging a slot 108 in the rear end of a pitman 109 slidably supported by studs 110. Near its forward end the pitman 109 is provided with a rectangular opening 111 surrounding a three sided block 112 attached to the side of the gear 101. The block 112 is so shaped and so placed with reference to the gear 101 that shortly after the second turn of the handle 91 begins the pitman 109 will be drawn forward, thereby rocking the frame 93 to position the platen 96 under the type. The use of the block 112 gives dwells in the movement of the pitman 109 which are long enough to permit the arms 94 to swing up to apply ink to the type and allow for the operation of a paper table described later on. After the frame 93 has been rocked to bring the platen under the type, the arms 94 again raise the frame 93 to press the platen against the type to take impressions.

In order to aline the ink pad and platen 96 with the type as they are raised and hold them in alinement the stud 107 is long enough to extend under a fixed plate 114 suitably formed to coöperate with the stud to rock the frame 93 slightly in either direction and hold it against further rocking movement. As shown in Fig. 2, the slot 108 in the pitman 109 is enlarged at its upper end so as to permit this movement and also prevent any interference because of any slight movement which the pitman might be given by the block 112 with either the ink pad or the platen in the elevated position.

The ink pad 92 is kept supplied with ink by a roller 116 with which the pad comes in contact when the frame 93 is rocked. The roller 116 is in turn supplied with ink by a roller 117 engaging a large supply roller 118. The rollers 116, 117 and 118 are driven to distribute the ink by the usual ratchet mechanism operated through a link connection 119 to the pitman 109.

The machine has a work receiving table 121 which is normaly in position to have the check deposited on it and is moved during the operation of the machine to carry the check into position to receive the impression. For this purpose, the table is provided at its sides with rollers 122 (Fig. 2) operating on rails 123. Fastened to the table or plate 121 near the middle thereof is a rack 124 engaging a gear 125 (see also Fig. 8) secured to a shaft 126. Fastened to the right hand end of the shaft 126 is a pinion 127 engaging rack teeth rigid with the pitman 109. When the pitman 109 is operated to swing the frame 93 to position the platen 96 under the type, the paper table 121 will be moved rearward to carry the check between the type wheels and platen and is returned to the position shown in the drawing when the frame 93 is returned to its original position.

The table 121 is provided with adjustable stops 131 (Fig. 1) to guide the operator in placing the check in correct vertical position on the table and a stop 132 serves a similar purpose in positioning the check with reference to its length. Pivoted to the table 121 are grippers 133 (Figs. 2 and 6) integral with arms 134 extending down through the table, the arms 134 being connected by springs 135 to studs 136 secured to the table. Fastened to the upper part of the casing 11 are brackets 137. When the table 121 is in its normal position, the brackets 137 and arms 134 will coöperate to hold the grippers 133 up against the tension of the springs 135 so that the paper may be freely inserted. As soon as the table 121 starts rearward, however, the arms 134 are carried away from the brackets 137 whereupon the springs 135 will swing the grippers to the position shown in Fig. 7, thereby holding the paper in position on the paper table. When the table returns to its original position the grippers will be opened automatically to permit removal of the check.

In order to operate the machine to print a check, the check is first placed upon the table 121. The writing key 15 corresponding to the first word to be printed is then depressed and the handle 35 is given a complete rotation. During this rotation the shoulder 42 corresponding to the depressed key will operate the pawl 22 attached to the key and thereby rotate the cam shaft 55 one division to release the latch 56 associated with the right hand wheel at the instant that the desired word type reaches the printing position. This operation is repeated until the complete line has been set up. The spacing key 17 is then depressed and the handle turned to lock the rest of the type carriers in position where their blank slugs 63 will be above the printing line. The handle 71 is next operated to push the type forms or slugs together to close up the gaps and the printing handle 91 is then given two complete rotations. During the first rotation, the ink pad 92 will apply ink to the type and during the second rotation, the platen will be engaged with the type to take an impression. Between the inking and the taking of the impression the table 121 will be carried in position for the paper to receive the imprint. After the impression has been taken, the error key is depressed and the handle 35 turned as far as it will go in the same direction as before, thereby successively releasing the latches 56 to permit the springs 36 to restore their type wheels to normal relation with the operating handle and the operating shaft 33 and driving the shaft 55 back to its original position.

While the form of embodiment herein shown and described is admirably adapted to fulfill the purposes stated, it is not the desire to be limited to the one embodiment as the invention is capable of various modifications and changes all coming within the scope of the claims which follow:

What is claimed is:

1. In a machine of the class described, the combination with a series of adjustable type carriers, each provided with type forms to print all of the words used in writing amounts, of a key board common to the type carriers, and means controlled by the key board for setting the type carriers to print different amounts.

2. In a machine of the class described, the combination with a series of adjustable type wheels, each provided with type forms to print all of the words used in writing amounts, of a key board common to the type wheels and comprising a key for each of such words, and means controlled by the keys for setting the type wheels to print different amounts.

3. In a machine of the class described, the combination with a series of adjustable type wheels, each provided with type forms to print all of the words used in writing amounts, of a key board common to the type wheels and comprising a key for each of the words, and means controlled by the key board for setting the type wheels in an invariable sequence to compose a printing line.

4. In a machine of the class described, the combination with a series of adjustable type wheels, each provided with type forms to print all of the words used in writing amounts, of a key board common to the type wheels and comprising a key for each word, means for adjusting the type wheels to different positions, and means controlled by the keys for successively arresting the type carriers when they have been set to print the words corresponding to the operated keys.

5. In a machine of the class described, the combination with a series of rotary type wheels, each provided with type forms to print all of the words used in writing amounts, of a key board common to the type wheels and comprising a key for each of the words to be printed, an operating handle, connections whereby movement of the handle will simultaneously turn the type wheels, and means controlled by the keys for arresting the type wheels in different positions corresponding to the operated keys.

6. In a machine of the class described, the combination with a series of rotary type wheels, each provided with type forms to print all of the words used in writing amounts, of a key board common to the type wheels and comprising a key for each of the words, a printing platen, means for turning the type wheels in unison with reference to the platen, and means controlled by the keys for independently arresting the type wheels in different positions and holding them in position.

7. In a machine of the class described, the combination with a series of rotatable typewheels, each provided with type forms to print all of the words used in writing amounts, of a key board common to the type wheels and comprising a key for each of the words, means for adjusting the type carriers to different positions, a rotary member carrying shoulders differentially spaced with reference to the keys, and means controlled by the keys and actuated by said shoulders for separately arresting the type wheels in desired positions.

8. In a machine of the class described, the combination with a series of adjustable type supports, of slidable type forms of different lengths carried in said supports, each support carrying forms to print all of the words used in writing amounts, a key board common to the type supports and comprising a key for each type form in each support, means controlled by the keys for adjusting the supports to position desired type forms at a printing line, means for sliding the positioned type forms together in order to print the words in close juxtaposition, and means for returning the type forms to their original positions.

9. In a machine of the class described, the combination with a series of differentially adjustable type supports, each provided with type forms to print all of the words used in writing amounts, said type forms being of different lengths and slidable relative to their supports, of a key board, means controlled by the keys for establishing setting relationship between the keys and the type supports automatically and in an invariable sequence, devices controlled by the keys for successively setting the type supports to compose a printing line, means for shifting the type forms at said line to print the words in close juxtaposition to each other, and means for restoring the type forms to original position.

10. In a machine of the class described, the combination with a set of differentially adjustable type carriers, of a key board, a rotary member provided with shoulders placed on its periphery with reference to the different keys, means for imparting setting movement to the type carriers, means whereby depression of a key into the path of the corresponding shoulder will arrest the type support in position to print a word corresponding to the operated key, and means for automatically and successively establishing operative relationship between the type carriers and said arrested means.

11. In a machine of the class described, the combination with type carriers adjustable to compose printing lines, of a movable element, an ink applying device and a platen carried by said element, and means for automatically moving the element first to apply ink to the type and then to carry the platen against the type to take an impression.

12. In a machine of the class described, the combination with printing type, of a movable frame, an ink pad and a platen carried by said frame, means for automatically operating the frame first to carry the ink pad into contact with the type and then forcing the platen against the type to take impressions, and means for feeding the paper into printing position after the ink is applied and before the impression is taken.

13. In a machine of the class described, the combination with type carriers adjustable to compose different printing lines, of a pivotally mounted frame, an ink pad and a platen carried by said frame, means for first pressing the ink pad against the positioned type and then forcing the platen into printing engagement with said type, and means for rocking the pivoted element between the inking and printing operations.

14. In a machine of the class described, the combination with printing type, of a movable frame, an ink pad and a platen carried by said frame, means for moving the frame first to carry the ink pad into contact with the type forms and then forcing the platen into engagement with the type, and means effective as the platen moves toward the type for applying ink to the ink pad.

15. In a machine of the class described, the combination with printing type, of a movable device carrying an ink pad and a platen, means for moving said device first to ink the type and then to move the platen into printing engagement with the type, a work support automatically moved to carry the work into printing position after the type are inked and before the platen is moved into engagement with the type, normally ineffective work gripping devices carried by the work support, and means whereby movement of the support to carry the work into printing position will render the grips effective.

16. In a machine of the class described, the combination with a series of adjustable type carriers each provided with type forms to print all of the words used in writing amounts, of a keyboard common to the type wheels and comprising a key for each of the words, means for adjusting the type wheels to different positions, means controlled by the keys for successively arresting the type carriers when they have been set to print the words corresponding to the operated keys, and means for latching the type carriers which are not to print in a non-printing position.

17. In a machine of the class described, the combination with a set of rotatable type carriers each provided with a series of adjustable type forms to print all of the words used in writing monetary amounts, of a keyboard having a number of printing keys corresponding to the set of forms in the type carrier, means for rotating the type carriers to different printing positions, means for latching each type carrier in position to print the word corresponding to the last key operated, and means for latching the type carriers which are not to be printed from in non-printing position.

18. In a machine of the class described, the combination with a set of rotatable type carriers each provided with a set of type forms for printing all of the words used in writing monetary values, of a keyboard having a number of printing keys corresponding to the number of forms in each type carrier, means for rotating the type carriers to different printing positions, means controlled by the keys for latching each type carrier in position to print the word corresponding to the key last operated, devices for latching the type carriers which are not to be printed from in non-printing position, and a manually operable device and connections for rendering said latching means effective.

19. In a machine of the class described, the combination with a series of adjustable type carriers each provided with a full set of type forms for printing all of the words used in writing monetary values, of a keyboard common to the type forms and comprising a key for each of the words, means for adjusting the type carriers to different printing positions, a rotary member provided with a series of helically arranged shoulders, means for imparting a step by step movement to said member as each type carrier is set, devices controlled by the keys and actuated by said shoulders for separably arresting the type carriers in desired positions, and key controlled means for restoring the rotary member to its starting position.

20. In a machine of the class described, the combination with a series of adjustable type carriers each provided with a full set of forms for printing all of the words used in writing monetary values, of a single printing key for each word, means for simultaneously adjusting all of the type carriers to different printing positions, a rotary member comprising a shoulder for each printing key, means for imparting a step by step movement to said member, devices controlled by the keys and actuated by the shoulders for latching the type carriers in positions corresponding to the printing keys operated, and key controlled means for restoring the devices to a starting point.

21. In a machine of the class described, the combination with a series of type carriers each provided with a full set of type forms for printing all of the words used in writing amounts, of a single printing key for each of the words used in writing monetary values, operating mechanism for moving the type carriers, means controlled by the keys and actuated by the operating mechanism for latching the type carriers in different positions to set up values to be printed, means for taking impressions, and means comprising a manually operated key for restoring the type carriers to starting point after the impression is taken.

22. In a machine of the class described, the combination with a series of type carriers each provided with a full set of type forms for printing all of the words used in writing monetary values, of a single printing key for each of the words used in writing monetary values, operating mechanism for adjusting the type carriers under the control of the keys to set up the values to be printed, means for taking impressions, and means controlled by the operating mechanism for restoring the type carriers to a starting position after the impression has been taken.

23. In a machine of the class described, the combination with a series of type carriers each provided with a full set of type forms for printing all of the words used in writing monetary values, of a single printing key for each of the words used in writing monetary values, operating mechanism controlled by said printing keys for adjusting the type carriers to set up the values to be printed, means for taking impressions, an error key, and means controlled jointly by the error key and operating mechanism for restoring the type carriers to a starting position.

24. In a machine of the class described, the combination with a series of type carriers each provided with a type form for printing each of the words used in writing monetary values, of a single printing key for each of the words used in writing monetary values, mechanism intermediate the type carriers and printing keys for adjusting the type carriers in an invariable sequence to set up the values to be printed, a spacing key, and means controlled by said spacing key for setting the type carriers which are not to be printed from at a neutral position.

25. In a machine of the class described, the combination with a series of type carriers each provided with a type form for printing each of the words used in writing monetary values and a blank form, said type forms and blank form being slidable laterally of the type carriers, a printing key for each of the words used in writing monetary values, mechanism intermediate the type carriers and printing keys for adjusting the type carriers in an invariable sequence to set up the values to be printed, a spacing key, means controlled by the spacing key for setting the type carriers which are not to be printed from in position with their blank forms in alinement with the word type forms, and means for effecting the lateral movement of the forms at the printing position.

26. In a machine of the class described, the combination with type carriers adjustable to compose printing lines, of a movable member, an ink pad and a platen carried by said member, means for moving said member to set the platen and ink pad successively opposite the printing line and for successively pressing the pad and platen against the type at said line.

27. In a machine of the class described, the combination with a base containing inking mechanism and platen operating mechanism, of a top member hinged to said base and containing type carriers and setting mechanism therefor, and an operating handle and connections for operating the inking and impression mechanism.

28. In a machine of the class described, the combination with a base member, of type inking and platen mechanism mounted in said base, a top member hinged to said base and containing a series of type carriers and setting mechanism therefor, an impression handle and connections for operating the inking and impression mechanism for taking repeated impressions from the type carriers, and latching devices for holding the hinged top against movement during said inking and printing operations.

HERBERT H. STEELE.